United States Patent
Raffalt et al.

(10) Patent No.: US 6,545,556 B2
(45) Date of Patent: Apr. 8, 2003

(54) OSCILLATING ELEMENT THAT CAN BE PIEZOELECTRICALLY EXCITED

(75) Inventors: Felix Raffalt, Hausach (DE); Adrian Frick, Wolfach (DE); Ingo Harter, Schapbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 09/792,007

(22) Filed: Feb. 23, 2001

(65) Prior Publication Data

US 2002/0014117 A1 Feb. 7, 2002

(30) Foreign Application Priority Data

May 15, 2000 (DE) .......................... 100 23 302

(51) Int. Cl.[7] .......................... H03B 5/32; H04R 17/00; H04R 17/10
(52) U.S. Cl. .................... 331/158; 73/290 V; 310/338; 340/618
(58) Field of Search .................. 331/158; 73/290 R, 73/290 V, 291; 310/311, 328, 338; 340/603, 612, 614, 618, 626

(56) References Cited

U.S. PATENT DOCUMENTS 6,148,665 A * 11/2000 Getman et al. .......... 73/290 V

FOREIGN PATENT DOCUMENTS

WO 92/21945 12/1992

* cited by examiner

Primary Examiner—David C. Mis
(74) Attorney, Agent, or Firm—Nath & Associates PLLC; Gary M. Nath; Marvin C. Berkowitz

(57) ABSTRACT

An oscillating element, particularly for a level sensor, comprises an oscillating diaphragm (3), a stack of piezoelectric elements (6, 7), and a tie bolt (4) connected to the diaphragm (3) for pressing the piezoelectric elements (6, 7) against the diaphragm (3). The tie bolt (4) forms a single piece with the diaphragm (3).

8 Claims, 1 Drawing Sheet

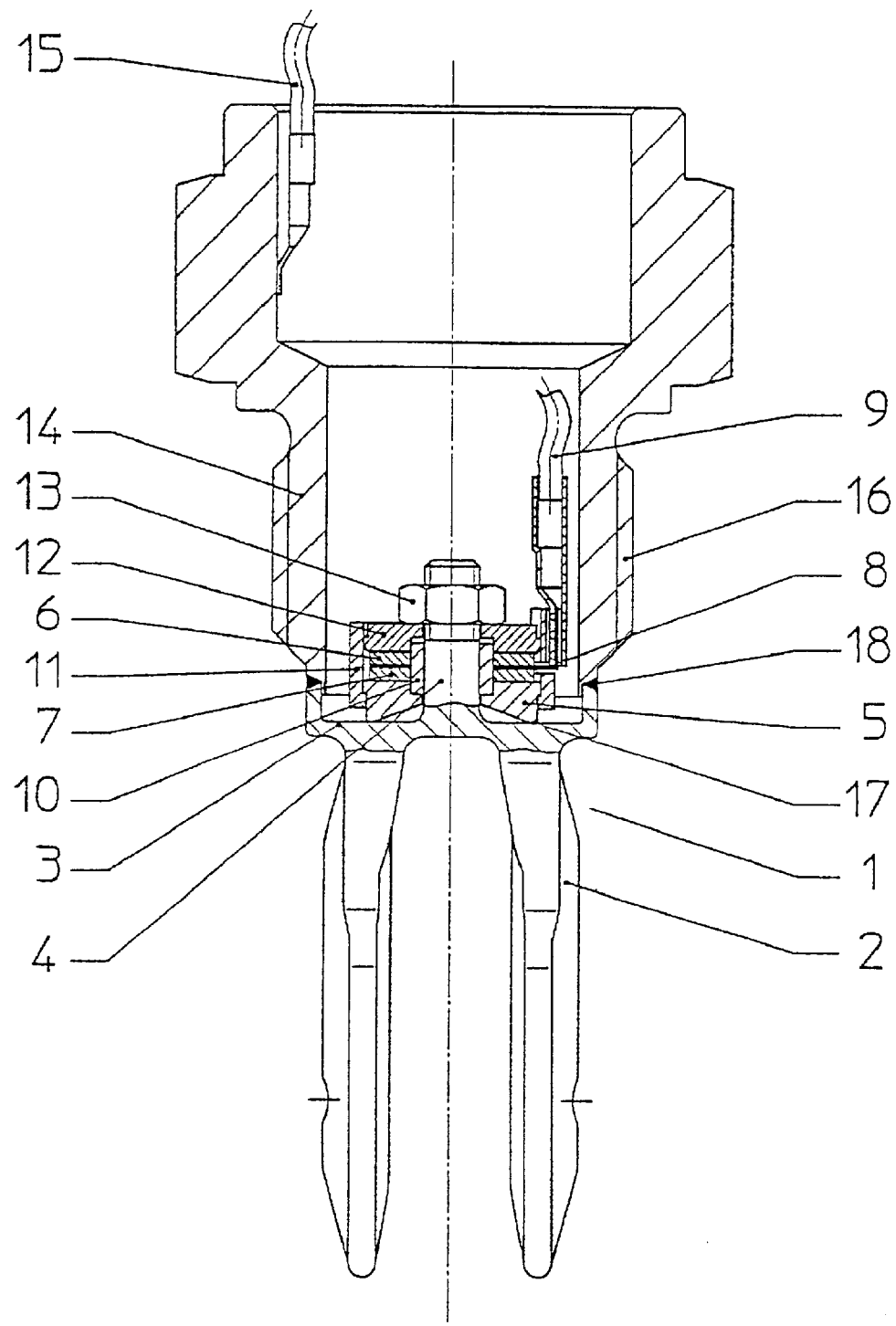

OSCILLATING ELEMENT THAT CAN BE PIEZOELECTRICALLY EXCITED

FIELD OF THE INVENTION

The present invention relates to an oscillating element that can be piezoelectrically excited. Oscillating elements of this kind are particularly employed in level sensors installed in, e.g., a container for a flowing or fluidizable medium, particularly a liquid. Depending on the level of the liquid, the oscillating elements may or may not be in contact with the liquid. The oscillating frequency of the oscillating elements is affected by contact with the liquid.

BACKGROUND OF THE INVENTION

Oscillating elements for level sensors are known in different designs. Generally they comprise a diaphragm that oscillates and that supports the oscillating bodies provided for contact with the liquid being measured, as well as a stack of peizoelectric elements, whose electrically induced expansion and contraction are transferred by a tie bolt to the diaphragm and induce oscillations in both the diaphragm and the oscillating bodies.

An initial example for this kind of oscillating element is described in EP 0 810 423 A2. In this known oscillating element the tie bolt is welded to the oscillating diaphragm and rises through a base plate that is positioned in fixed fashion at a distance from the diaphragm. Concentrically positioned on the base plate and around the tie bolt is a stack of ring-shaped piezoelements which are separated by insulating disks. The upper stack closure is formed by a rigid pressure disk, and pushing against this disk is a screw element which is screwed to the upper end of the tie bolt. Oscillation is induced and measured with the same piezoelements; signal guidance to the stack of piezoelements is performed by two electrical lines.

A second known oscillating element is described in WO 92/21945. In this oscillating element the base plate known from EP 0 810 423 A2 is replaced by a pressure disk which forms a lower closing for the stack of piezoelements and which presses against a shoulder that is formed in circular fashion on a rim area of the diaphragm. Oscillation is induced and measured by separate piezoelements; at least three electrical lines are employed.

Another oscillating element is known from EP 0 875 742 A1. Here also a pressure ring seals the stack of piezoelements on the lower side facing the diaphragm. Instead of a shoulder, this pressure ring presses against a pressure pin formed to the diaphragm.

A problem that arises in the construction of oscillating elements for level measurement rests in the fact that a particularly rigid coupling between the piezoelements and the diaphragm, or the oscillating bodies molded to it, is necessary in order for dampening of the movement of the oscillating body by the medium being measured to reliably react on the piezoelement and to be electrically detected there. Among the known oscillating elements, this requirement is successfully fulfilled when the oscillating bodies, which are usually formed of fork prongs, have a length of about 100 mm. With a reduction of the prong length to, e.g., 40 mm this requirement is no longer adequately fulfilled.

The cause of this problem is thought to rest in the fact that shortening the prongs leads to an increase in the resonance frequency of the oscillating element. In the case under consideration here, which involves a shortening of from about 100 to about 40 mm, there is an approximate threefold increase in the oscillating frequency. This results in a distinct uncoupling between the piezoelectric elements, which drive the oscillation, and the fork prongs, with the consequence that even when the fork prongs are completely blocked the drive remains mechanically capable of oscillation, though at a reduced level. A sufficiently rigid coupling between the drive and the fork prongs, however, is a necessary precondition for the electrical measurement of the fork's resonating frequency as based on the electrical signals that are induced by the oscillation of the fork in the piezoelements and that can be measured in the drive unit—electrical signals that here are referred to as detection signals. As long as the oscillating bodies are surrounded by air and are thus slightly dampened in any case, their oscillating movement is sufficiently true to the stimulation provided by the piezoelectric elements. However, as soon as they come into contact with the container material to be measured, and their oscillation is thereby further dampened, increased deviations between the detection signal and the actual resonance of the system of oscillating bodies and diaphragm arise, and undesirable harmonic wave oscillations occur. If the material that fills the container exceeds a certain viscosity value, the result will ultimately be an excessive uncoupling of the behavior of the oscillating bodies from the stimulation provided by the piezoelements, and thus a complete loss of function of the level sensor.

Another problem with the conventional oscillating element is the large number of single parts that are required. This affects not only the manufacturing costs of the oscillating element, it also reduces the latter's reliability. Particularly when the oscillating element is used at high temperatures, the individual parts are exposed to increased mechanical loads, which may result in the premature aging of the components.

Another problem with conventional oscillating elements is that mechanical tolerances determined by the manufacturing process result in the oscillating element having an electrical/mechanical efficiency that is dependent on the rotational position of the piezoelement relative to the tie bolt. In order to achieve the maximum mechanical oscillating amplitude determined by the design for a given excitation amplitude, it is therefore necessary in mounting the stack of piezoelements around the tie bolt to continue rotation in stages until the most favorable position is located, in which the stack of piezoelements then remains locked.

SUMMARY OF THE INVENTION

The goal of the invention is to specify a piezoelectrically excitable oscillating element that is better suited to miniaturization than the conventional oscillating elements. Other advantages of the oscillating element according to the invention are its small number of parts and the associated reduction in manufacturing costs.

In an oscillating element with an oscillating diaphragm, a stack of piezoelectric elements, and a tie bolt connected to the diaphragm for pressing the piezoelectric elements against the diaphragm this goal is achieved in that the tie bolt and the diaphragm are designed as a single piece. In this way a mechanical connection that is considerably more reliable and less susceptible to material fatigue is created between the piezoelements and the oscillating bodies.

This single-piece connection can be obtained in particular by producing the diaphragm and the tie bolt from a single piece by a treatment that reduces the material of the piece, particularly by machining.

In another solution to the problem, which nonetheless can be combined with the above-indicated solution in a preferred embodiment, the stack contains two piezoelectric elements between a pressure ring and support ring that touches the diaphragm; the pressure ring and the support ring can be connected with an initial drive potential; and an electrode positioned between the piezoelectric elements can be connected to a second drive potential. Limiting the system to two piezoelectric elements leads to a reduction in the structural height of the oscillating element and thus to an increased rigidity of its connection to the oscillating bodies; at the same time, it is possible—because the first drive potential must only be applied to one point on the stack—to omit a temperature-sensitive guide plate on the oscillating element, with the result that the oscillating element is suitable for application temperatures of up to 200° C.

An electrically conductive connection between the pressure ring and the support ring can be produced in simple fashion by means of the tie bolt. A simplified replacement capability for the oscillating element is created in that the piezoelectric elements, pressure ring, and support ring will preferably be combined in a structural unit that is enclosed by a housing part and that can be separated from the diaphragm and the tie bolt.

Other features and advantages of the invention will emerge from the following description of an exemplary embodiment, with reference to the attached FIGURE.

BRIEF DESCRIPTION OF THE DRAWING

The FIGURE shows the oscillating element according to the invention in an axial section.

DETAILED DESCRIPTION OF THE PREFERRED EMBODIMENT

The oscillating element comprises a metallic diaphragm 3 which forms the base of a metallic insert housing 14 that is basically bucket-shaped. The housing 14 is provided for mounting in the wall of a container with an external thread 16. Two oscillating bodies formed on the lower side of the diaphragm 3 in the form of fork prongs 2 project into the inside of the container. A tie bolt 4 rises from the upper side of the diaphragm 3 into the inside of the insert housing 14. A drive unit is positioned on the tie bolt 4 and is pressed against the diaphragm by a nut 13 screwed onto the tie bolt 4.

The drive unit is a stack of several ring-shaped elements, specifically a support ring 5, which is in direct contact with the diaphragm 3, a lower piezoelement 6, and a pressure ring 12, which receives the pressure force of the screw 13 and distributes it uniformly over the entire surface of the upper piezoelement 6. The pressure ring 12 and the support ring 5 consist of metal and simultaneously represent the electrodes of the two piezoelements 6, 7 that are complementary to the electrode 8.

The inner lateral surfaces of the piezoelements 6, 7 are electrically insulated against the tie bolt 4 by an insulating sleeve 10. Radially in the outward direction they are surrounded by a drive housing 11 which encompasses radial projections of the support ring 5 and the pressure ring 12 and thus combines in a single structural unit the indicated elements 5, 6, 7, 8, 12. As compared to conventional drive units with a larger number of piezoelectric elements, this structural unit is very flat in design and consists of only a few individual parts. The number of surface transitions that reduce rigidity is therefore small. Since the force of the drive is directly coupled to the diaphragm 3 by the support ring 5, there is only a short distance between the points at which the support ring 5 has an effect on the diaphragm 3 in the radial outward area of the face 17 of said support ring and the tie bolt 4. The contact of the support ring 5 with the diaphragm—contact which is concentric to the tie bolt—yields a rigid coupling.

The tie bolt 4 is not welded to the diaphragm, but is formed jointly with it into a single piece, e.g., by a metal-cutting treatment such as turning. As a result, the transitional cross-section from the tie bolt 4 to the diaphragm 3, while providing the same strength, can be smaller than would be possible if there were a welded connection between the two; in addition, structural changes in the diaphragm in the vicinity of the tie bolt 4, which are caused by welding and result in material hardening, are avoided. This is important, since stiffening of the diaphragm 3 itself is undesirable. It should be the only flexible component in the entire oscillating element; all other components must have a considerably higher degree of rigidity. The diaphragm 3 represents the interface of power transmission between the forked prongs 2 and the drive unit. The flexion of any other component demands the uncoupling of the forked prongs 2 and the drive unit, and is therefore undesirable.

The piezoelements 6, 7 are employed simultaneously as a drive system and to record the oscillation, as described, e.g., in EP 0810 423 A2. This reduces both the number of piezoelements and the number of required contact electrodes.

An initial drive potential is fed to the piezoelements 6, 7 by means of an initial drive line 9, which is connected to the electrode 8 enclosed between said piezoelements 6, 7. Since only one connecting electrode 8 is required, the drive line 9 can be connected directly to it. Special contact guide plates are not necessary, so that the oscillating element can be used at high temperatures of up to 200° C.

The second drive potential is applied to the outside of the piezoelement 6, 7 by way of the support ring 5 or the pressure ring 12. The pressure ring 12 is connected to the diaphragm 3 in conductive fashion by the nut 13 and the tie bolt 4; the diaphragm 3 is also in contact with the support ring 5. The diaphragm 3, in turn, is connected in conductive fashion by the welded connection 18 to the insert housing 14, to which a second drive line 15 is attached. Any necessary separation of potential with reference to the container into which the insert housing 14 is screwed can be performed in an evaluating electronic unit (not depicted) with the aid of a DC transformer and will have no effect on the oscillation characteristics.

The initial drive line 9 can be unshielded at least over the distance it runs through the insert housing 14, since the insert housing 14 fed with the second drive potential already represents a coaxial shield for the first drive line 9. This is particularly advantageous for sensor element designs in which the attachment site for the insert housing in the container wall, here the outer thread 16, and the diaphragm 3 are separated by a metallic extension tube of considerable length that is immersed in the container. Since this tube already acts as an electromagnetic shield, it is possible to omit a coaxial connecting line inside the tube, which under circumstances can be several meters long, must operate at high temperatures, and is expensive.

The low number of parts in the drive element makes the drive element particularly suitable for operation at high temperatures, e.g., at 200° C. Since the second drive element 15 can be provided with a contact in the area of the container wall, or outside the container, no special protective measures are necessary to assure the connection's fitness at high temperatures. Only the first drive line 9 is brought into contact with the electrode in the high temperature range in the vicinity of the diaphragm 3. This contact is advantageously produced by spot welding or a crimp connection, since a soldered connection is not suitable for the given operating temperatures.

The production of the diaphragm 3 and the tie bolt 4 from a single piece by means of turning makes is impossible for the tie bolt 4 to lie askew or to occupy a position other than the center of the diaphragm 3. Also eliminated are changes of an undefined extent in the steel microstructure of the diaphragm 3, since welding is not performed on the easily oscillating diaphragm surface. This and the very flat design of the drive unit, as well as the elimination of a number of components requiring design tolerances, contribute to the fact that the efficiency of the oscillating element according to the invention is independent of the rotational position of the drive unit relative to the tie bolt. In manufacturing the oscillating element, the work step that was heretofore required for setting the rotational orientation of the drive unit can be completely eliminated. The drive unit can be replaced rapidly and without difficulty.

What is claimed is:

1. An oscillating element with an oscillating diaphragm (3), a stack of piezoelectric elements (6, 7), and a tie bolt (4) that is attached to the diaphragm (3) and that presses the piezoelectric elements (6, 7) against the diaphragm (3), wherein the tie bolt (4) forms a single piece with the diaphragm (3).

2. An oscillating element according to claim 1, wherein the stack is positioned between a pressure ring (12) and a support ring (5) which touches the diaphragm, and consists of piezoelectric elements (6,7), while the pressure ring (12) and the support ring (5) can be connected to an initial drive potential, and an electrode (8) positioned between the piezoelectric elements (6,7) can be connected to a second drive potential.

3. An oscillating element according to claim 2, wherein the support ring (5) and the pressure ring (12) are connected in electrically conductive fashion by the tie bolt (4).

4. An oscillating element according to claim 2, wherein the piezoelectric elements (6,7), pressure ring (12), and support ring (5) are combined in a single structural unit by a housing part (11) that surrounds them and said structural unit can be separated from the diaphragm (3) and the tie bolt (4).

5. An oscillating element according to claim 1, wherein the support ring (5) touches the diaphragm (3) with a radially outward portion of its side (17) facing the diaphragm(3).

6. An oscillating element according to claim 2, wherein the pressure ring (12) and the support ring (5) are connected in electrically conductive fashion to an insert housing (14).

7. An oscillating element according to claim 1, wherein the tie bolt (4) and the diaphragm (3) are produced from a single piece by machining.

8. An oscillating element according to claim 1, wherein the diaphragm (3) exhibits fork prongs with a length from 20 to 70 mm, preferably about 40 mm.

* * * * *